US011400647B2

(12) United States Patent
Lu et al.

(10) Patent No.: US 11,400,647 B2
(45) Date of Patent: Aug. 2, 2022

(54) UTILIZATION OF MAGNETIC PARTICLES TO IMPROVE Z-AXIS STRENGTH OF 3D PRINTED OBJECTS

(71) Applicant: Xerox Corporation, Norwalk, CT (US)

(72) Inventors: Chunliang Lu, Webster, NY (US); Christopher Wolfe, Rochester, NY (US); John Ianni, Medina, NY (US); Mark Mercandetti, Victor, NY (US); John Pawlak, Rochester, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 253 days.

(21) Appl. No.: 16/818,754

(22) Filed: Mar. 13, 2020

(65) Prior Publication Data

US 2021/0283838 A1    Sep. 16, 2021

(51) Int. Cl.
| | |
|---|---|
| *B29C 67/00* | (2017.01) |
| *B29C 64/188* | (2017.01) |
| *B29C 64/118* | (2017.01) |
| *B29C 64/153* | (2017.01) |
| *B29C 64/393* | (2017.01) |
| *B33Y 10/00* | (2015.01) |
| *B33Y 40/00* | (2020.01) |
| *B33Y 50/02* | (2015.01) |

(52) U.S. Cl.
CPC .......... *B29C 64/188* (2017.08); *B29C 64/118* (2017.08); *B29C 64/153* (2017.08); *B29C 64/393* (2017.08); *B29K 2995/0008* (2013.01); *B29K 2995/0094* (2013.01); *B33Y 10/00* (2014.12); *B33Y 40/00* (2014.12); *B33Y 50/02* (2014.12)

(58) Field of Classification Search
CPC ... B29C 64/188; B29C 64/118; B29C 64/153; B29C 64/393; B33Y 10/00; B33Y 30/00; B33Y 40/00; B33Y 50/00; B33Y 50/02; B29K 2995/0008; B29K 2995/0094
See application file for complete search history.

(56) References Cited

U.S. PATENT DOCUMENTS

| | | | | |
|---|---|---|---|---|
| 9,457,521 | B2* | 10/2016 | Johnston | ................. B29C 70/62 |
| 2013/0056672 | A1* | 3/2013 | Johnston | ................. B22F 10/20 |
| | | | | 252/62.54 |
| 2018/0229442 | A1 | 8/2018 | Ucar et al. | |

FOREIGN PATENT DOCUMENTS

| | | |
|---|---|---|
| DE | 102015016959 A1 | 6/2016 |
| EP | 2565022 A1 | 6/2013 |

OTHER PUBLICATIONS

EP search report mailed in correspondence EP# 21159111.0 dated Jul. 30, 2021, 8 pages.

* cited by examiner

*Primary Examiner* — Ryan M Ochylski

(57) ABSTRACT

A method for improving z-axis strength of a 3D printed object is disclosed. For example, the method includes printing a three-dimensional (3D) object with a polymer and magnetic particles, heating the 3D object to a temperature at approximately a melting temperature of the polymer, and applying a magnetic field to the 3D object to locally move the magnetic particles in the polymer to generate heat and fuse the polymer around the magnetic particles to improve a z-axis strength of the 3D object.

20 Claims, 5 Drawing Sheets

UTILIZATION OF MAGNETIC PARTICLES TO IMPROVE Z-AXIS STRENGTH OF 3D PRINTED OBJECTS

The present disclosure relates generally to three-dimensional (3D) printed objects and, more particularly, to using magnetic particles with a 3D print material to improve z-axis strength of 3D printed object.

BACKGROUND

Three-dimensional printers can be used to print 3D objects. The 3D printers can be used to print a variety of different types of objects using different types of materials. Different types of processes can be used for 3D printing. For example, 3D printing can use subtractive processes (e.g., where a block of material is etched to print the final object) or additive processes (e.g., printing a 3D object layer-by-layer).

One type of additive 3D printing process may be fused deposition modeling (FDM). The FDM process may dispense a layer of material onto a platform. A binder fluid may be printed onto the layer of material. Energy may be applied to the layer and portions of the layer that receive the binder fluid may be fused together. The process may be repeated and the non-fused portions of each layer may be removed via a de-caking process. However, current FDM processes may suffer from relatively weak z-axis strength (e.g., a cross-sectional direction of the layers).

SUMMARY

According to aspects illustrated herein, there is provided a method, non-transitory computer readable medium, and an apparatus for improving z-axis strength of a 3D printed object. One disclosed feature of the embodiments is a method that prints a three-dimensional (3D) object with a polymer and magnetic particles, heats the 3D object to a temperature at approximately a melting temperature of the polymer, and applies a magnetic field to the 3D object to locally move the magnetic particles in the polymer to generate heat and fuse the polymer around the magnetic particles to improve a z-axis strength of the 3D object.

Another disclosed feature of the embodiments is a non-transitory computer-readable medium having stored thereon a plurality of instructions, the plurality of instructions including instructions which, when executed by a processor, cause the processor to perform operations that print a three-dimensional (3D) object with a polymer and magnetic particles, heat the 3D object to a temperature at approximately a melting temperature of the polymer, and apply a magnetic field to the 3D object to locally move the magnetic particles in the polymer to generate heat and fuse the polymer around the magnetic particles to improve a z-axis strength of the 3D object.

Another disclosed feature of the embodiments is an apparatus comprising a processor and a computer readable medium storing a plurality of instructions which, when executed by the processor, cause the processor to perform operations that print a three-dimensional (3D) object with a polymer and magnetic particles, heat the 3D object to a temperature at approximately a melting temperature of the polymer, and apply a magnetic field to the 3D object to locally move the magnetic particles in the polymer to generate heat and fuse the polymer around the magnetic particles to improve a z-axis strength of the 3D object.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and print material that includes magnetic particles to improve z-axis strength of 3D printed objects. As discussed above, some 3D printing processes may use an FDM process. However, the bond between each layer may be relatively weak. Thus, the z-axis strength (e.g., an axis that runs vertically through each layer of the 3D object) may be relatively weak.

The present disclosure provides a unique print material for 3D printing that includes magnetic particles. The print material may be in a powder form or a filament form and may be dispensed for FDM 3D printing processes. A magnetic field may be applied after each layer is printed to generate a magnetic field, locally move the magnetic particles to generate heat, and further locally fuse the polymer powder between layers to improve bond strength between layers. In addition, the magnetic field may align the magnetic particles to further improve bond strength. As a result, the methods and print materials of the present disclosure may improve the z-axis strength of the 3D printed object.

Figure 1:
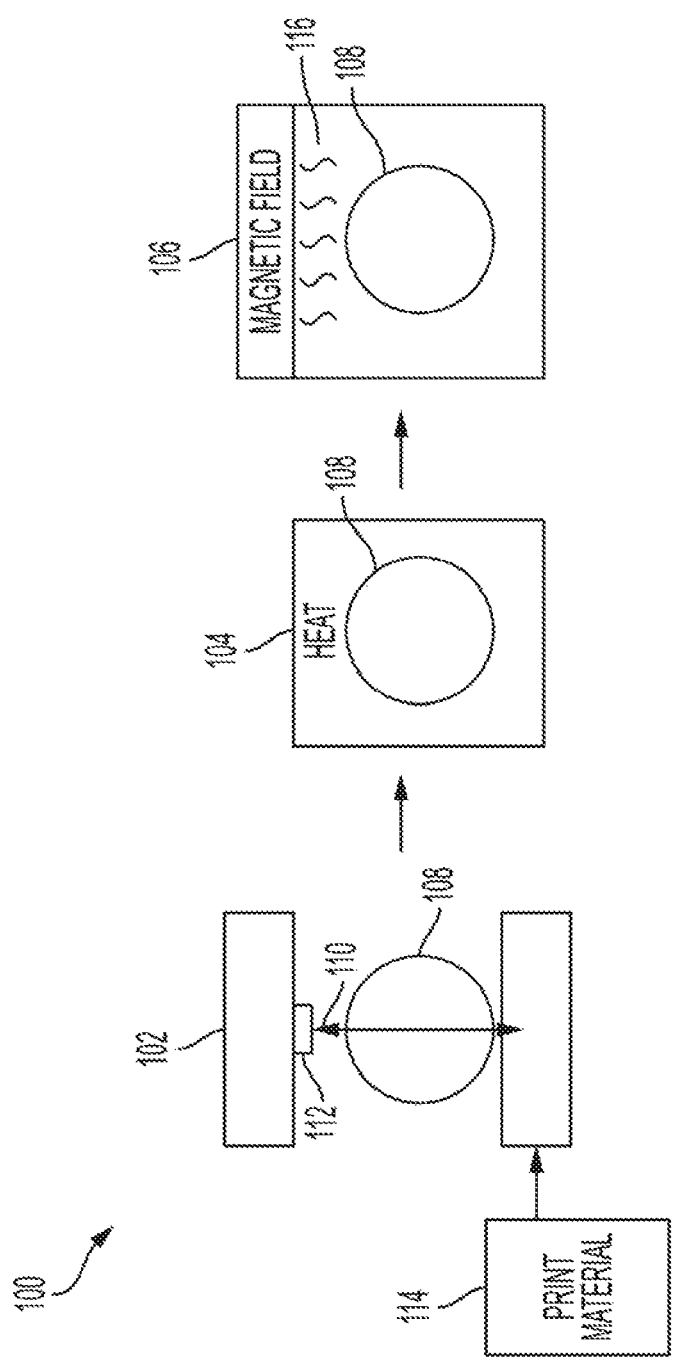
FIG. 1 illustrates a block diagram of a system of the present disclosure.

FIG. 1 illustrates an example system 100 of the present disclosure. In one embodiment, the system 100 may include a 3D printer 102, an oven 104 and an apparatus 106 to apply a magnetic field 116. Although the oven 104 and the apparatus 106 are illustrated as separate devices, it should be noted that the oven 104 and the apparatus 106 can be combined as single device.

In one embodiment, the 3D printer may include a supply of print material 114 to print a 3D object 108. The 3D printer 102 may include a printhead 112 to dispense a printing fluid on a layer of the print material 114. The 3D object 108 may be printed layer-by-layer. Although the 3D object 108 is shown as a sphere in FIG. 1, it should be noted that any shaped object may be printed. The 3D object 108 can be printed to different shapes, sizes, and complexities.

In one embodiment, the print material 114 may use a combination of a polymer and a magnetic particle to improve the strength of a z-axis 110 of the 3D object 108. The z-axis 110 may be a direction that runs vertically through each printed layer of the 3D object 108. The magnetic particles may range from 10 nanometers (nm) to 10 microns (μm) and 0.1 weight percent (wt %) to 15 wt % depending on whether the print material 114 is dispensed as a powder or a filament.

As discussed in further details below, the magnetic field 116 applied to the 3D object may help to align the magnetic particles in the 3D object 108. The alignment of the magnetic particles may improve the z-axis strength due to the magnetic attraction of the magnetic particles. In addition, the magnetic field 116 may create localized heating from movement of the magnetic particles to create more inter-layer fusing and inter-layer polymer chains for further improved z-axis strength of the 3D object 108. For example, the localized movement may create friction of the magnetic particles to generate heat. In addition, magnetic induction and hysteresis may generate heat.

In one embodiment, the 3D printer 102 may be any type of 3D printer. For example, the 3D printer may be a selective laser sintering (SLS) printer, a fused deposition modeling (FDM) printer, and the like. The print material 114 may be provided in a powder form for SLS printers or in a continuous filament for FDM printers.

Figure 2:
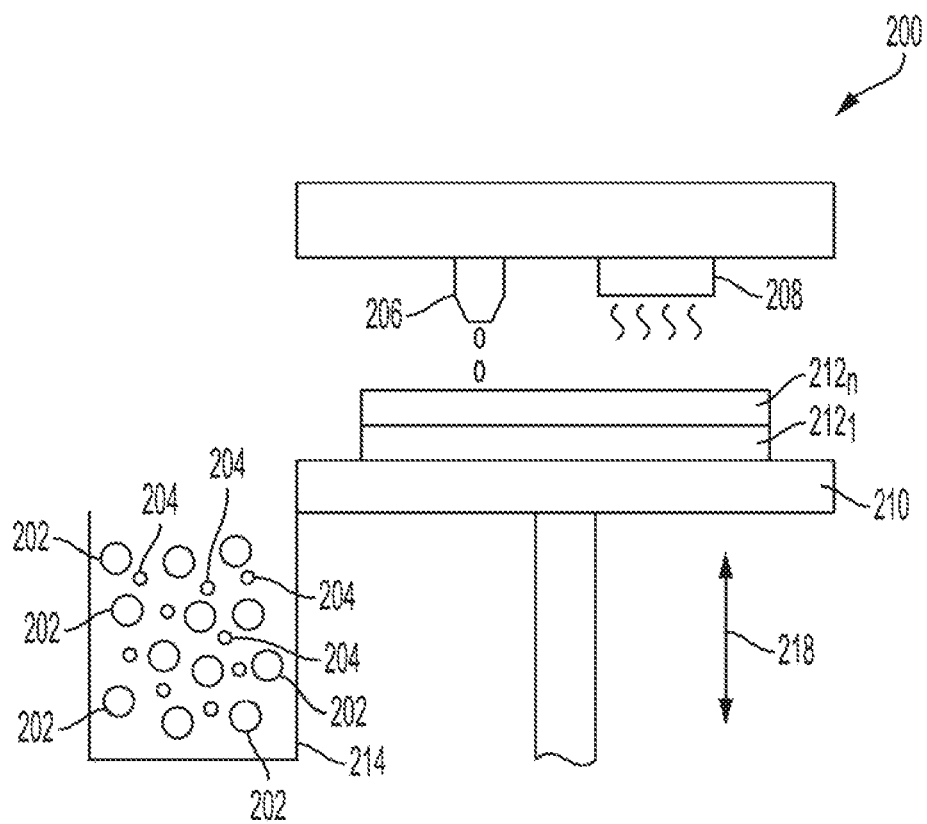
FIG. 2 illustrates a schematic diagram of printing a 3D object using a polymer and magnetic particles of the present disclosure.

FIG. 2 illustrates a schematic diagram of a 3D printer that uses a print material 114 where polymers 202 and magnetic particles 204 are mixed together. The combination of the polymer 202 and the magnetic particles 204 can then be dispensed to print each layer of the 3D object 108.

FIG. 2 illustrates an example of a powder based combination of the polymers 202 and the magnetic particles 204 in a supply/container 214. For example, the powder based combination may be used in an SLS 3D printer.

In one embodiment, the polymers 202 may include materials such as polylactic acid (PLA), nylon (e.g., nylon 6, 10, or 12), polycarbonate, polyethylene terephthalate (PET), high density polyethylene (HDPE), polypropylene, polystyrene, acrylonitrile butadiene styrene (ABS), and the like. The polymers 202 may be dispensed in a powder form having any average diameter size appropriate for a particular 3D printer 200.

In one embodiment, the magnetic particles 204 may include magnetic metals such as ferrites, iron oxides, ferrite and silicon dioxide ($SiO_2$) core-shell nanoparticles, magnetic/metallic nanoparticles, iron, cobalt, nickel, metallic alloys thereof, and the like. For a powder based print material 114, the magnetic particles 204 may have an average particle diameter size of 1 nm to 5 μm. In one embodiment, the average particle diameter size may be approximately 50 nm to 3 μm. In one embodiment, the average particle diameter size may be approximately 75 nm to 1 μm.

In one embodiment, the magnetic particles 204 may comprise approximately 0.1 wt % to 15 wt % of the print material 114 (e.g., the total weight of the combination of the polymers 202 and the magnetic particles 204). In one embodiment, the magnetic particles 204 may comprise approximately 3 wt % to 10 wt %. In one embodiment, the magnetic particles 204 may comprise approximately 4 wt % to 6 wt %.

In one embodiment, the magnetic particles 204 may be blended with the polymers 202. The magnetic particles 204 and the polymers 202 may be blended in a temperature controlled blender with high blending power so that the magnetic particles 204 may be partially embedded onto the polymers 202.

In one embodiment, the combination of the polymers 202 and the magnetic particles 204 may be dispensed onto a platform 210 to form a layer 212$_1$. Under the control of a processor or a controller, a printhead 206 may dispense a printing fluid onto desired portions of the layer 212$_1$. The printhead 206 may be moved along an x-y coordinate plane above the layer 212$_1$. The printing fluid may be a binder that helps melt the polymers 202 to form portions of the 3D object 108 that is printed when exposed to an energy source 208. The portions that do not receive the printing fluid may not be fused and may be removed during a de-caking process after all of the layers 212$_1$ to 212$_n$ are printed.

The platform 210 may be moved vertically (as shown by an arrow 218). After the layer 212$_1$ is printed, the platform 210 may be lowered to receive another layer 212$_n$ of the polymers 202 and the magnetic particles 204. The printing process may be repeated for each layer 212$_1$ to 212$_n$.

As noted above, FIG. 2 illustrates an example for an SLS printer. However, the 3D printer 200 may also be a FDM printer that prints with a continuous filament. As a result, the magnetic particles 204 may be combined with a continuous filament of the polymer 202. The filament can be formed to include both the polymer 202 and magnetic particles 204.

In one embodiment, the magnetic particles 204 can be absorbed or fused onto the extruded filament of the polymers 202 during a drawing process (e.g., when the filament of polymers 202 is above a melting temperature during extrusion). The magnetic particles 204 can be powder sprayed onto the extruded filament of polymers 202 to be combined as a layer of the polymers 202 is deposited.

In one embodiment, when the polymers 202 and the magnetic particles 204 are dispensed as a continuous filament, the average particle diameter of the magnetic particles 204 may be approximately 10 nm to 10 μm. In one embodiment, the average particle diameter of the magnetic particles 204 may be approximately 90 nm to 8 μm. In one embodiment, the average particle diameter of the magnetic particles 204 may be approximately 1 μm to 5 μm.

In one embodiment, the magnetic particles 204 may comprise approximately 1 wt % to 10 wt % of the filament (e.g., total weight of the polymers 202 and the magnetic particles 204 when delivered as a filament for FDM printers). In one embodiment, the magnetic particles 204 may comprise approximately 1 wt % to 8 wt %. In one embodiment, the magnetic particles 204 may comprise approximately 2 wt % to 5 wt %. Thus, the size of the magnetic particles 204 and the approximate weight percent may be a function of whether the polymers 202 are delivered in a powder for SLS printers or as a continuous filament for FDM printers.

Figure 3:
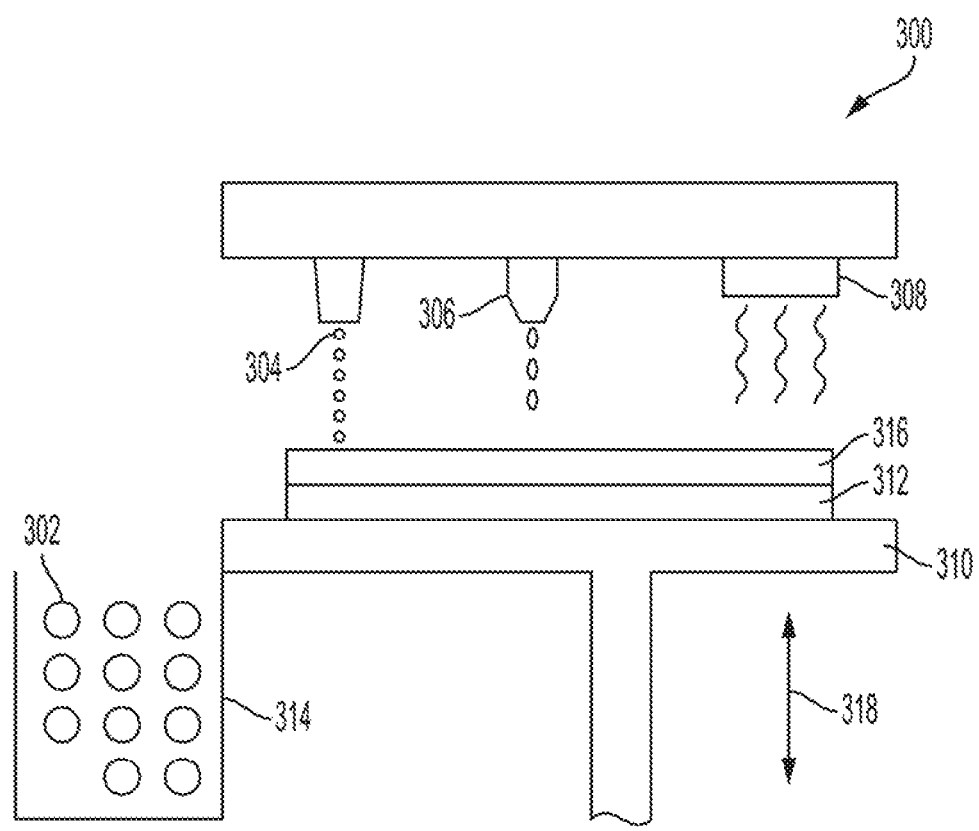
FIG. 3 illustrates another schematic diagram of printing a 3D object using a polymer and magnetic particles of the present disclosure.

FIG. 3 illustrates an example of a printer 300 where polymers 302 and magnetic particles 304 of the print material 114 are delivered separately. In one embodiment, the printer 300 may be an SLS 3D printer. The printer 300 may include a supply container 314 of the polymers 302 in powder form. The polymers 302 may be dispensed to form a layer 312 of the polymers 302 on a movable platform 310. A printhead 306, under the control of a processor or controller, may dispense a printing fluid onto desired portions of the layer 312. The printing fluid may be a binder fluid that helps to fuse selected portions of the layer 312 when exposed to an energy source 308 (as described above).

After the layer 312 is printed, a layer 316 of the magnetic particles 304 may be dispensed onto the layer 312 of the polymers 302. In one embodiment, the printhead 306 may dispense the printing fluid onto the layer 316 and expose the layer 316 to the energy source 308.

After the layers 312 and 316 are printed, the platform 310 may be lowered or moved vertically (as shown by an arrow 318). The process may then be repeated until all layers of the 3D object 108 are printed.

In one embodiment, the average particle diameter and weight percent of the magnetic particles 304 may be the same as described above for SLS or powder based printing. For example, the magnetic particles 304 may have an average particle diameter size of 1 nm to 5 μm. In one embodiment, the average particle diameter size may be approximately 50 nm to 3 μm. In one embodiment, the average particle diameter size may be approximately 75 nm to 1 μm.

In one embodiment, the magnetic particles 304 may comprise approximately 0.1 wt % to 15 wt % of the print material 114 (e.g., the total weight of the combination of the polymers 202 and the magnetic particles 204). In one embodiment, the magnetic particles 304 may comprise approximately 3 wt % to 10 wt %. In one embodiment, the magnetic particles 304 may comprise approximately 4 wt % to 6 wt %.

Although an example of a powder based printer is illustrated in FIG. 3, the printer 300 may also be a FDM 3D printer that uses a supply of the polymer 302 in a filament form. Thus, the layer 312 may be formed by dispensing the polymer 302 from an extruded filament. The layer 312 may be printed (e.g., with the printing fluid from the printhead 306 and fused by the energy source 308). The layer 316 may then be dispensed to deposit a layer of the magnetic particles 304 separately on top of the layer 312 of the polymer 302.

In one embodiment, the average particle diameter and weight percent of the magnetic particles 304 may be the same as described above for FDM or filament based printing. For example, the magnetic particles 304 may have an average particle diameter size of 10 nm to 10 μm. In one embodiment, the average particle diameter size may be approximately 90 nm to 8 μm. In one embodiment, the average particle diameter size may be approximately 1 μm to 5 μm.

In one embodiment, the magnetic particles 304 may comprise approximately 1 wt % to 10 wt % of the print material 114 (e.g., the total weight of the combination of the polymers 202 and the magnetic particles 204). In one embodiment, the magnetic particles 304 may comprise approximately 1 wt % to 8 wt %. In one embodiment, the magnetic particles 304 may comprise approximately 2 wt % to 5 wt %.

Referring back to FIG. 1, after the 3D object 108 is printed with the print material 114 that includes both the polymer and the magnetic particles, the 3D object 108 may be placed in the oven 104. The 3D object 108 may then be heated to a temperature that is close to the melting temperature of the polymer 202 or 302. In other words, the temperature may be a temperature that is near the melting temperature of the polymer 202 or 302 without causing the 3D object 108 to lose shape from melting. For example, the temperature may be approximately 20 degrees Celsius (° C.) below the melting temperature of the polymer 202 or 302 to approximately the melting temperature of the polymer 202 or 302.

After the 3D object 108 is brought up to the desired temperature, the magnetic field 116 can be applied to the 3D object 108. In one embodiment, the strength of the magnetic field 116 may be approximately 1 oersted (Oe). In one embodiment, the magnetic field 116 may help to align the pole movement of the magnetic particles 204 or 304 in the 3D object 108. The alignment of the magnetic particles 204 or 304 may help create a magnetic attraction between the magnetic particles 204 or 304 to help improve inter-layer bond strength. As a result, the overall z-axis strength of the 3D object 108 may be improved.

In one embodiment, the magnetic field 116 may be oscillated or pulsed. The oscillation of the magnetic field 116 may create localized movement of the magnetic particles 204 or 304 in the 3D object. For example, oscillation of the magnetic field 116 may cause the magnetic particles 204 or 304 to rotate back and forth in accordance with the oscillation pattern of the magnetic field 116. This movement may cause friction between the magnetic particles 204 or 304 and the polymers 202 or 302 to create localized heat in various internal locations of the 3D object 108. The movement and friction may help to melt the polymers 202 or 302 in regions between the layers (e.g., layers 212) of the 3D object 108 and around the magnetic particles 204 or 304. The magnetic field 116 may also cause magnetic induction and/or hysteresis to generate heat and melt the polymers 202 or 302 in regions between the layers (e.g., layers 212) of the 3D object 108. The melting of the regions between the layers may promote further mixing and entanglement of the polymer chains to improve the z-axis strength of the 3D object 108.

In one embodiment, the magnetic field 116 may be oscillated or pulsed at a range of approximately 10 hertz (Hz) to 500 megahertz (MHz). In one embodiment, the magnetic field 116 may be oscillated or pulsed at a range of approximately 250 Hz to 100 MHz. In one embodiment, the magnetic field 116 may be oscillated or pulsed at a range of approximately 500 Hz to 10 MHz.

In one embodiment, a feedback loop may be implemented. For example, the z-axis strength of the 3D object 108 may be tested after the magnetic field 116 is applied. If testing of the z-axis strength fails, the 3D object 108 may be placed back into the oven 104 and/or the apparatus 106 for further heating and application of the magnetic field 116.

Figure 4:
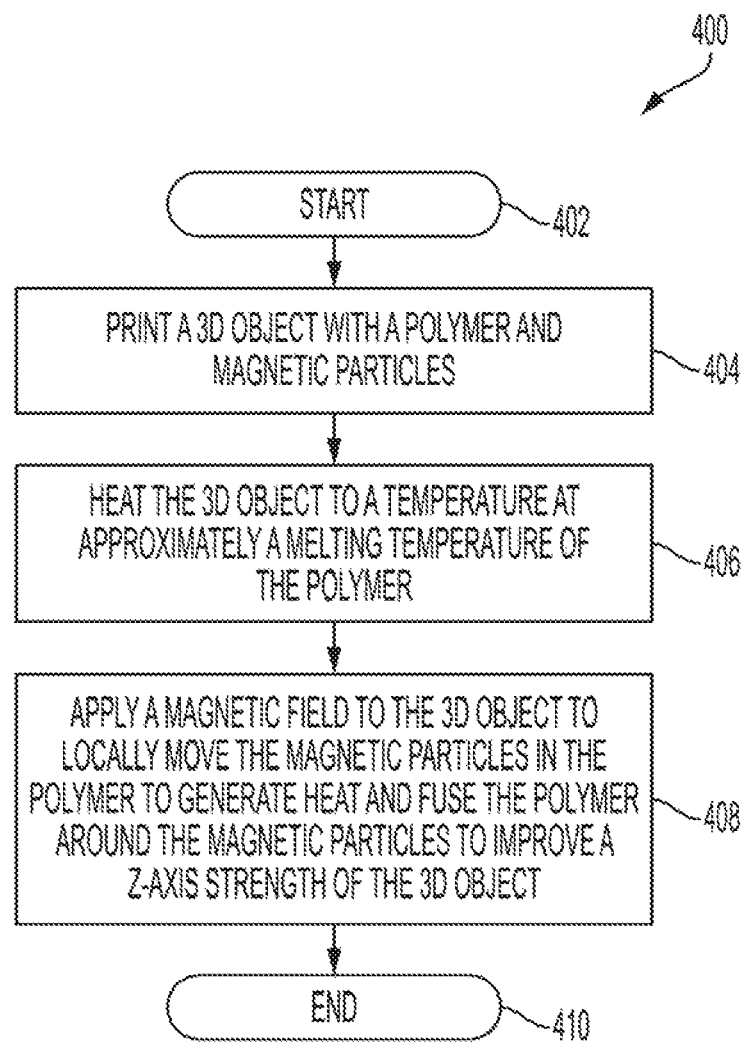
FIG. 4 illustrates a flowchart of an example method for improving z-axis strength of a 3D printed object of the present disclosure.
Figure 5:
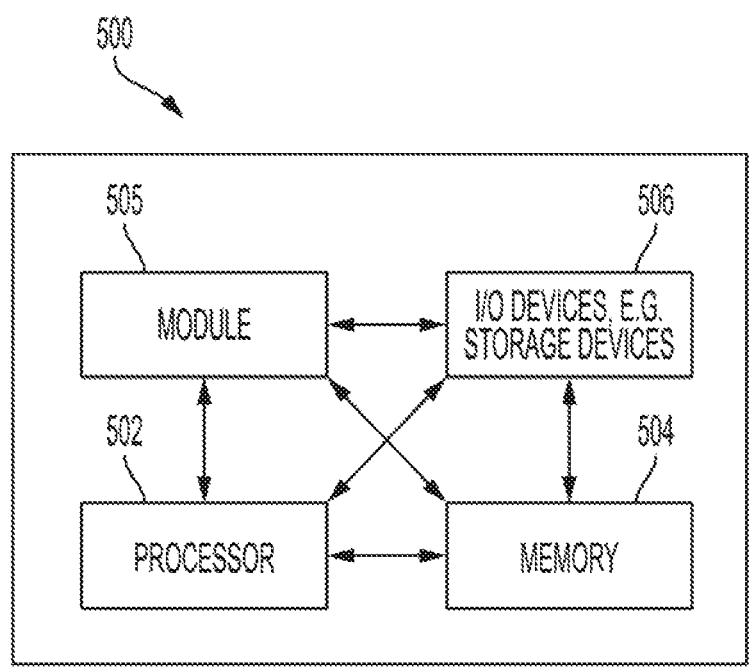
FIG. 5 illustrates a high-level block diagram of an example computer suitable for use in performing the functions described herein.

FIG. 4 illustrates a flowchart of an example method 400 for improving z-axis strength of a 3D printed object of the present disclosure. In one embodiment, one or more blocks of the method 400 may be performed by the system 100, or a computer/processor that controls operation of the system 100 as illustrated in FIG. 5 and discussed below.

At block 402, the method 400 begins. At block 404, the method 400 prints a three-dimensional (3D) object with a polymer and magnetic particles. For example, an SLS or FDM based 3D printer may use a print material that comprises a mixture of the polymer and the magnetic particles. In one embodiment, the SLS based 3D printer may use a powder based polymer combined with the magnetic particles. The SLS based 3D printer may print each layer with a combination of the polymer and the magnetic particles or may print separate layers of the polymer and the magnetic particles, as described above.

In one embodiment, for the SLS based 3D printer, the magnetic particles may have an average particle diameter size of 1 nm to 5 μm. In one embodiment, the average particle diameter size may be approximately 50 nm to 3 μm. In one embodiment, the average particle diameter size may be approximately 75 nm to 1 μm.

In one embodiment, the magnetic particles may comprise approximately 0.1 wt % to 15 wt % of the print material (e.g., the total weight of the combination of the polymers and the magnetic particles). In one embodiment, the magnetic particles may comprise approximately 3 wt % to 10 wt %. In one embodiment, the magnetic particles may comprise approximately 4 wt % to 6 wt %.

In one embodiment, the FDM based 3D printer may use a filament based polymer combined with the magnetic polymers. The magnetic particles may be mixed with the polymer to form the filament. In another embodiment, the magnetic particles may be sprayed onto the filament of the polymer as the filament is extruded. The magnetic particles may then fuse with the melted polymer that is extruded.

In another embodiment, the FDM based 3D printer may print separate layers of the polymer and the magnetic particles. For example a layer of the polymer may be extruded from the filament and a layer of the magnetic particles may be dispensed on top of the polymer layer, as described above.

In one embodiment, for the FDM based 3D printer, the magnetic particles may have an average particle diameter size of 75 nm to 10 µm. In one embodiment, the average particle diameter size may be approximately 90 nm to 8 µm. In one embodiment, the average particle diameter size may be approximately 1 µm to 5 µm.

In one embodiment, the magnetic particles may comprise approximately 1 wt % to 10 wt % of the print material (e.g., the total weight of the combination of the polymers and the magnetic particles). In one embodiment, the magnetic particles may comprise approximately 1 wt % to 8 wt %. In one embodiment, the magnetic particles may comprise approximately 2 wt % to 5 wt %.

At block 406, the method heats the 3D object to a temperature at approximately a melting temperature of the polymer. For example, the temperature may be approximately 20 degrees Celsius (° C.) below the melting temperature of the polymer to approximately the melting temperature of the polymer.

At block 408, the method applies a magnetic field to the 3D object to locally move the magnetic particles in the polymer to generate heat and fuse the polymer around the magnetic particles to improve a z-axis strength of the 3D object. For example, after the 3D object is brought up to the desired temperature, the magnetic field may be applied to the 3D object. The strength of the magnetic field may be approximately 1 Oe.

In one embodiment, the magnetic field may be oscillated or pulsed. The oscillation of the magnetic field may create localized movement of the magnetic particles in the 3D object. For example, oscillation of the magnetic field may cause the magnetic particles to rotate back and forth in accordance with the oscillation pattern of the magnetic field. This movement may create localized heat in various internal locations of the 3D object to melt regions between the layers of the 3D object. The melting of the regions between the layers may promote further mixing and entanglement of the polymer chains to improve the z-axis strength of the 3D object.

In one embodiment, the magnetic field may be oscillated or pulsed at a range of approximately 10 hertz (Hz) to 500 megahertz (MHz). In one embodiment, the magnetic field may be oscillated or pulsed at a range of approximately 250 Hz to 100 MHz. In one embodiment, the magnetic field may be oscillated or pulsed at a range of approximately 500 Hz to 10 MHz.

In one embodiment, the magnetic field may help to align the pole movement of the magnetic particles in the 3D object. The alignment of the magnetic particles may help create a magnetic attraction between the magnetic particles to help improve inter-layer bond strength. As a result, the overall z-axis strength of the 3D object may be improved. At block 410, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for improving z-axis strength of a 3D printed object, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for improving z-axis strength of a 3D printed object (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for improving z-axis strength of a 3D printed object (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   printing a three-dimensional (3D) object with a print material comprising polymer and magnetic particles;
   heating the 3D object to a temperature at approximately a melting temperature of the polymer; and
   applying a magnetic field to the 3D object to locally move the magnetic particles in the polymer to generate heat and fuse the polymer around the magnetic particles to improve a z-axis strength of the 3D object, wherein the applying comprises oscillating the magnetic field to rotate the magnetic particles back and forth in accordance with a pattern of oscillation to create localized heat in various internal locations of the 3D object.

2. The method of claim 1, wherein the printing comprises:
printing a layer of the 3D object with the polymer;
dispensing the magnetic particles on top of the layer; and
repeating the printing the layer and the dispensing until the 3D object is printed.

3. The method of claim 1, wherein the printing is performed by a selective laser sintering (SLS) printer.

4. The method of claim 3, wherein the magnetic particles are blended with the polymer to embed the magnetic particles into particles of the polymer.

5. The method of claim 3, wherein the magnetic particles comprise 0.1-15 weight percent of the print material.

6. The method of claim 3, wherein the magnetic particles comprise an average particle diameter of 1 nanometer to 5 microns.

7. The method of claim 1, wherein the printing is performed using a fused deposition modeling (FDM) printer.

8. The method of claim 7, wherein the magnetic particles are fused onto an extruded filament of the polymer during a drawing process.

9. The method of claim 7, wherein the magnetic particles comprise 1-10 weight percent.

10. The method of claim 7, wherein the magnetic particles comprise an average particle diameter of 10 nanometers to 10 microns.

11. The method of claim 1, wherein the magnetic field is oscillated at a range of approximately 10 hertz to 500 megahertz.

12. A non-transitory computer-readable medium storing a plurality of instructions, which when executed by a processor, cause the processor to perform operations, the operations comprising:
printing a three-dimensional (3D) object with a print material comprising polymer and magnetic particles;
heating the 3D object to a temperature at approximately a melting temperature of the polymer; and
applying a magnetic field to the 3D object to locally move the magnetic particles in the polymer to generate heat and fuse the polymer around the magnetic particles to improve a z-axis strength of the 3D object, wherein the applying comprises oscillating the magnetic field to rotate the magnetic particles back and forth in accordance with a pattern of oscillation to create localized heat in various internal locations of the 3D object.

13. The non-transitory computer-readable medium of claim 12, wherein the printing comprises:
printing a layer of the 3D object with the polymer;
dispensing the magnetic particles on top of the layer; and
repeating the printing the layer and the dispensing until the 3D object is printed.

14. The non-transitory computer-readable medium of claim 12, wherein the magnetic particles are blended with the polymer to embed the magnetic particles into particles of the polymer.

15. The non-transitory computer-readable medium of claim 14, wherein the magnetic particles comprise 0.1-15 weight percent.

16. The non-transitory computer-readable medium of claim 14, wherein the magnetic particles comprise an average particle diameter of 1 nanometer to 5 microns.

17. The non-transitory computer-readable medium of claim 12, wherein the magnetic particles are fused onto an extruded filament of the polymer during a drawing process.

18. The non-transitory computer-readable medium of claim 17, wherein the magnetic particles comprise 1-10 weight percent of the print material.

19. The non-transitory computer-readable medium of claim 17, wherein the magnetic particles comprise an average particle diameter of 10 nanometers to 10 microns.

20. A method, comprising:
printing a three-dimensional (3D) object with a print material comprising polymer and magnetic particles, wherein the magnetic particles comprise an average particle diameter of 1 nanometer to 10 microns and comprise 0.1 to 15 weight percent of the print material;
heating the 3D object to a temperature at approximately a melting temperature of the polymer; and
applying an oscillating magnetic field to the 3D object to align the magnetic particles in the polymer and rotate the magnetic particles back and forth in accordance with a pattern of oscillation to generate heat that melts regions between layers of the 3D object to promote entanglement of polymer chains between the layers to improve a z-axis strength of the 3D object.

* * * * *